United States Patent
Shelby et al.

(10) Patent No.: US 7,241,838 B2
(45) Date of Patent: Jul. 10, 2007

(54) BLENDS OF ALIPHATIC-AROMATIC COPOLYESTERS WITH ETHYLENE-VINYL ACETATE COPOLYMERS

(75) Inventors: Marcus David Shelby, Kingsport, TN (US); Andrew Joseph Matosky, Kingsport, TN (US); Candace Michele Tanner, Kingsport, TN (US); Michael Eugene Donelson, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 187 days.

(21) Appl. No.: 10/743,488

(22) Filed: Dec. 19, 2003

(65) Prior Publication Data

US 2005/0137303 A1 Jun. 23, 2005

(51) Int. Cl.
*C08L 67/02* (2006.01)
(52) U.S. Cl. ............... 525/173; 525/176; 524/47; 524/425; 524/423; 524/435; 524/493
(58) Field of Classification Search ............. 524/284, 524/47, 425, 423, 435, 493; 525/173, 176
See application file for complete search history.

(56) References Cited

U.S. PATENT DOCUMENTS

| | | | |
|---|---|---|---|
| 2,012,267 A | 8/1935 | Carothers | |
| 3,937,757 A | 2/1976 | Seydl et al. | |
| 4,749,773 A | 6/1988 | Weaver | |
| 4,826,903 A | 5/1989 | Weaver | |
| 4,845,188 A | 7/1989 | Weaver | |
| 4,882,412 A | 11/1989 | Weaver | |
| 4,892,922 A | 1/1990 | Weaver | |
| 4,892,923 A | 1/1990 | Weaver | |
| 5,057,561 A | 10/1991 | Manica et al. | |
| 5,225,490 A | 7/1993 | Tokiwa | |
| 5,262,458 A | 11/1993 | Bastioli et al. | |
| 5,290,631 A | 3/1994 | Fleury | |
| 5,292,783 A * | 3/1994 | Buchanan et al. ......... 524/37 |
| 5,434,238 A | 7/1995 | White et al. | |
| 5,446,079 A | 8/1995 | Buchanan et al. | |
| 5,559,171 A | 9/1996 | Buchanan et al. | |
| 5,580,911 A | 12/1996 | Buchanan et al. | |
| 5,599,858 A | 2/1997 | Buchanan et al. | |
| 5,661,193 A | 8/1997 | Khemani et al. | |
| 5,817,721 A | 10/1998 | Warzelhan | |
| 5,889,135 A | 3/1999 | Warzelhan | |
| 5,900,322 A | 5/1999 | Buchanan et al. | |
| 5,998,505 A | 12/1999 | Brink | |
| 6,018,004 A | 1/2000 | Warzelhan | |
| 6,020,393 A | 2/2000 | Khemani | |
| 6,303,677 B1 * | 10/2001 | Warzelhan et al. ......... 524/291 |
| 6,495,656 B1 | 12/2002 | Haile et al. | |
| 6,497,950 B1 | 12/2002 | Haile et al. | |
| 6,562,938 B2 | 5/2003 | Haile et al. | |
| 6,573,340 B1 | 6/2003 | Khemani et al. | |

FOREIGN PATENT DOCUMENTS

| | | | |
|---|---|---|---|
| EP | 0 435 435 A | | 7/1991 |
| JP | 56-38367 A | | 4/1981 |
| JP | 56038367 A | * | 4/1981 |
| JP | 61-183372 A | | 8/1986 |
| JP | 2-296861 A | | 12/1990 |
| JP | 6-65484 A | | 3/1994 |
| JP | 9-235456 A | | 9/1997 |
| WO | WO 93/03098 A | | 2/1993 |
| WO | WO 02/078944 A | | 10/2002 |

OTHER PUBLICATIONS

International Search Report for PCT/US2004/041066 dated Mar. 17, 2005.
Bastiolio, C., *Degradable Polymers*, 1995, Chapman & Hall: London, pp. 112-137.
Nielson, L. E., *Polymer Rheology*, Marcel Dekker, New York (1977), p. 63.

* cited by examiner

*Primary Examiner*—David W. Wu
*Assistant Examiner*—Satya B. Sastri
(74) *Attorney, Agent, or Firm*—Eric D. Middlemas; Louis N. Moreno; Bernard J. Graves, Jr.

(57) ABSTRACT

Disclosed are blends of aliphatic-aromatic copolyesters with poly(ethylene-co-vinyl acetate) copolymers and shaped articles prepared therefrom. These blends have higher melt strength than the aliphatic-aromatic copolyester alone and exhibit increased melt strength and better processability. In addition, the blends and shaped articles show bio-disintegration and/or biodegradability in a composting environment.

39 Claims, No Drawings

BLENDS OF ALIPHATIC-AROMATIC COPOLYESTERS WITH ETHYLENE-VINYL ACETATE COPOLYMERS

FIELD OF THE INVENTION

This invention pertains to biodegradable blends of aliphatic-aromatic copolyesters with polyolefins containing vinyl acetate. More particularly, this invention pertains to blends of aliphatic-aromatic copolyesters and poly(ethylene-co-vinyl acetate) copolymers and shaped articles prepared therefrom. These blends have a higher melt strength than the copolyester alone and exhibit better processability.

BACKGROUND OF THE INVENTION

Certain aliphatic-aromatic copolyesters, abbreviated herein as "AAPE", are known to be biodegradable, i.e., undergoing fragmentation and microbial breakdown within a composting environment. These copolyesters, unfortunately, suffer from poor melt strength in comparison with other film resins like polyethylene, thereby making processing on conventional polymer processing equipment (e.g. to produce blown film, cast film, fiber, etc.) difficult. For example, low melt strength often results in more line breaks, instability, and lower throughput rates on processing equipment, which increases the cost of the final polymer article. This lack of processability has restricted the range of applications of AAPE copolyesters and makes a low cost, high melt strength AAPE particularly desirable.

Melt strength is related to the viscosity of the polymer, particularly at low shear rates. It is a measure of the stiffness or "elasticity" of the polymer in the molten state. Higher melt strength generally results in greater ease in processing film or other articles such as, for example, profiles, extrusion blow molded bottles, fibers, etc., and better mechanical properties for the manufactured articles. Melt strength can be measured in many different ways. For example, the low or "zero shear" viscosity of the polymer can be used as one indicator of melt strength. An alternative method is to measure the time it takes for the polymer to sag a given distance under its own weight. This latter approach gives a more intuitive method for gauging melt strength and also incorporates how cooling of the film can also play a role in increasing the melt strength. Yet a third method is to determine the melt index of the polymer, which is known to be inversely correlated to the melt strength or a polymer.

Blends of polyesters and vinyl acetate containing polymers have been reported. For example, U.S. Pat. No. 3,937,757 describes molding compositions based on polybutylene terephthalate blended with 5 to 50 weight % of polyolefins including ethylene vinyl acetate. The PBT can contain up to 20% of modifying acids or glycols. The molded articles made from blends have improved electrical tracking resistance. U.S. Pat. Nos. 5,225,490; 5,661,193; 5,817,721; 5,889,135; 6,018,004; 6,020,39; 6,303,677 disclose biodegradable polyesters useful for biodegradable moldings, adhesives, foams, and coatings, etc. U.S. Pat. Nos. 5,599,858; 5,580,911; 5,446,079; and 5,559,171 disclose binary and ternary blends containing cellulose esters and biodegradable polyesters. These blends are disclosed as useful for shaped articles including fibers, films, and shaped articles.

AAPE's and some of their blends often have inadequate melt strength and can be difficult to process at lower temperatures. For example, blends of cellulose esters and AAPE's, because of the higher melt temperature of the cellulose ester, require high processing temperatures which offsets any gains in melt strength. Further, blending AAPE's with other polymers to improve melt strength is often expensive and reduces the biodegradability of the polymer. Thus, blends and additives that increase the melt strength but significantly reduce the composting rates provide little benefit. It is, therefore, desirable to develop an inexpensive AAPE copolyester that retains satisfactory biodegradability while exhibiting improved melt strength.

SUMMARY OF THE INVENTION

We have discovered that blends of aliphatic-aromatic copolyesters with poly(ethylene-co-vinyl acetate) copolymers, abbreviated herein as "EVAc", have improved melt strength and processability in comparison to the neat AAPE. These blends are useful for the manufacture of shaped articles such as, for example, films, fibers, profiles, and molded articles. Thus, our invention provides a polymer blend, comprising:
(A) about 50 to about 99 weight percent (wt %) of an aliphatic-aromatic random copolyester (AAPE); and
(B) about 1 to about 50 wt % of a poly(ethylene-co-vinyl acetate) copolymer (EVAc), wherein the blend has a melt index less than the melt index of the AAPE, as determined by ASTM Method D-1238. The weight percentages are based on the total weight of the blend. To achieve the desired improvements in melt strength, the blends of the present invention are not intended to include significant amounts (i.e., 5 wt % or more) of cellulose esters. In a preferred embodiment, the blends of our invention do not contain a cellulose ester. In addition to EVAc, the blends of the invention may contain branching agents and/or chain extenders to further increase melt strength. Our blends are inexpensive to produce and show excellent melt strength, processability, and good mechanical properties. Further, the blends show excellent fragmentation and breakdown in a composting environment.

In addition to aliphatic and aromatic residues, the blends of the invention may contain biodegradable additives to enhance their disintegration and biodegradability in the environment. Thus, another aspect of the present invention is polymer blend, comprising:
(A) about 50 to about 98 weight percent (wt %), based on the total weight of the blend, of an aliphatic-aromatic random copolyester comprising
  (a) diol residues comprising the residues of one or more of: 1,4-butanediol; 1,3-propanediol; ethylene glycol; 1,6-hexanediol; diethylene glycol; or 1,4-cyclohexanedimethanol; and
  (b) diacid residues comprising
    (i) about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and
    (ii) about 5 to about 65 mole %, based on the total moles of diacid residues, of the residues of one or more aromatic dicarboxylic acid's selected from terephthalic acid and isophthalic acid;

(B) about 1 to about 20 wt %, based on the total weight of said blend, of an EVAc comprising about 4 to about 30 wt %, based on the total weight of said EVAc, of the residues of vinyl acetate; and (C) about 1 to about 40 wt %, based on the total weight of said blend, of a biodegradable additive, wherein said blend has a melt index less than the melt index of said AAPE, as determined by ASTM Method D-1238. Examples of biodegradable additives include thermoplastic starch, microcrystalline cellulose, methyl cellulose, hydroxypropyl cellulose, polylactic acid, polyhydroxybutyrate, or polyvinyl alcohol.

The invention also provides a shaped articles such as, for example, films, fibers, extruded objects, and molded objects, prepared from the AAPE/EVAc blends. These articles may be biodisintegratable and/or biodegradable and may be used in many commercially valuable products such as disposable diapers, feminine hygiene products, bed liners, bandages, food and trash bags, agricultural compost sheets, and the like. In addition, the invention also provides a process for the preparation of the blends of the invention and a process for improving the melt strength of AAPE's.

DETAILED DESCRIPTION

The present invention provides blends of aliphatic-aromatic polyesters, abbreviated herein as "AAPE" or "AAPE's", that are useful in molding, fiber, and film applications. The blends have increased melt strength, higher throughput, and better processability at lower temperatures over the AAPE alone. In a general embodiment, the invention provides a polymer blend, comprising:

(A) about 50 to about 99 weight percent (wt %) of an aliphatic-aromatic random copolyester (AAPE); and (B) about 1 to about 50 wt % of a poly(ethylene-co-vinyl acetate) copolymer (EVAc), wherein the blend has a melt index less than the melt index of the AAPE. The weight percentages are based on the total weight of said blend. The blends of the present invention do not contain significant amounts (i.e., 5 wt % or more) of cellulose esters and, in another embodiment, may not contain any cellulose esters. Our blends may contain branching and chain extension agents to further increase their melt strength. Shaped articles from the blends of the invention are biodisintegradable, show excellent fragmentation and breakdown in a compostable environment, and are believed to be biodegradable as defined by ASTM Standard Method D6340-98. Further, the blends of our invention may contain one or more biodegradable additives to enhance their disintegration and biodegradability in the environment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically, the difunctional carboxylic acid is a dicarboxylic acid and the difunctional hydroxyl compound is a dihydric alcohol such as, for example, glycols and diols. The term "aliphatic-aromatic polyester", as used herein, means a polyester comprising a mixture of residues from aliphatic or cycloaliphatic dicarboxylic acids or diols and aromatic dicarboxylic acids or diols. The term "non-aromatic", as used herein with respect to the dicarboxylic acid and diol monomers of the present invention, means that carboxyl or hydroxyl groups of the monomer are not connected through an aromatic nucleus. For example, adipic acid contains no aromatic nucleus in its backbone, i.e., the chain of carbon atoms connecting the carboxylic acid groups, thus is "non-aromatic". By contrast, the term "aromatic" means the dicarboxylic acid or diol contains an aromatic nucleus in the backbone such as, for example, terephthalic acid or 2,6-naphthalene dicarboxylic acid. "Non-aromatic", therefore, is intended to include both aliphatic and cycloaliphatic structures such as, for example, diols and dicarboxylic acids, which contain as a backbone a straight or branched chain or cyclic arrangement of the constituent carbon atoms which may be saturated or paraffinic in nature, unsaturated, i.e., containing non-aromatic carbon-carbon double bonds, or acetylenic, i.e., containing carbon-carbon triple bonds. Thus, in the context of the description and the claims of the present invention, non-aromatic is intended to include linear and branched, chain structures (referred to herein as "aliphatic") and cyclic structures (referred to herein as "alicyclic" or "cycloaliphatic"). The term "non-aromatic", however, is not intended to exclude any aromatic substituents which may be attached to the backbone of an aliphatic or cycloaliphatic diol or dicarboxylic acid In the present invention, the difunctional carboxylic acid typically is a aliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone. The term "residue", as used herein, means any organic structure incorporated into a polymer or plasticizer through a polycondensation reaction involving the corresponding monomer. The term "repeating unit", as used herein, means any repetitive organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The AAPE's used in the present invention, typically, are prepared from dicarboxylic acids and diols which react in substantially equal proportions and are incorporated into the polyester polymer as their corresponding residues. The AAPE's of the present invention, therefore, contain substantially equal molar proportions of diacid residues (100 mole %) and diol residues (100 mole %) such that the total moles of repeating units is equal to 100 mole %. The mole percentages provided in the present disclosure, therefore, may be based on the total moles of diacid residues, the total moles of diol residues, or the total moles of repeating units. For example, a polyester containing 30 mole % adipic acid, based on the total diacid residues, means that the polyester contains 30 mole % adipic residues out of a total of 100 mole % diacid residues. Thus, there are 30 moles of adipic residues among every 100 moles of diacid residues. In another example, a polyester containing 30 mole % 1,6-hexanediol, based on the total diol residues, means that the polyester contains 30 mole % 1,6-hexanediol residues out of a total of 100 mole % diol residues. Thus, there are 30 moles of 1,6-hexanediol residues among every 100 moles of diol residues.

The blends of this invention comprise an AAPE and a poly(ethylene-co-vinyl acetate) copolymer (EVAc). The AAPE may be a linear or branched random copolyester and/or chain extended copolyester comprising diol residues which comprise the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will comprise 1 to about 4 substituents independently selected from halo, $C_6$–$C_{10}$ aryl, and $C_1$–$C_4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol with the preferred diols comprising one or more diols selected from 1,4-butanediol; 1,3-propanediol; ethylene glycol; 1,6-hexanediol; diethylene glycol; or 1,4-cyclohexanedimethanol. The AAPE also comprises diacid residues which contain about 35 to about 99 mole %, based on the total moles of diacid residues, of the residues of one or more substituted or unsubstituted, linear or branched, non-aromatic dicarboxylic acids selected from aliphatic dicarboxylic acids containing 2 to about 12 carbon atoms and cycloaliphatic acids containing about 5 to about 10 carbon atoms. The substituted non-aromatic dicarboxylic acids will typically contain 1 to about 4 substituents selected from halo, $C_6$–$C_{10}$ aryl, and $C_1$–$C_4$ alkoxy. Non-limiting examples of non-aromatic diacids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. In addition to the non-aromatic dicarboxylic acids, the AAPE comprises about 1 to about 65 mole %, based on the total moles of diacid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$–$C_{10}$ aryl, and $C_1$–$C_4$ alkoxy. Non-limiting examples of aromatic dicarboxylic acids which may be used in the AAPE of our invention are terephthalic acid, isophthalic acid, salts of 5-sulfoisophthalic acid, and 2,6-naphthalenedicarboxylic acid. More preferably, the non-aromatic dicarboxylic acid will comprise adipic acid, the aromatic dicarboxylic acid will comprise terephthalic acid, and the diol will comprise 1,4-butanediol.

Other preferred compositions for the AAPE's of our invention are those prepared from the following diols and dicarboxylic acids (or polyester-forming equivalents thereof such as diesters) in the following mole percentages, based on 100 mole percent of a diacid component and 100 mole percent of a diol component:

(1) glutaric acid (about 30 to about 75%); terephthalic acid (about 25 to about 70%); 1,4-butanediol (about 90 to 100%); and modifying diol (0 about 10%);
(2) succinic acid (about 30 to about 95%); terephthalic acid (about 5 to about 70%); 1,4-butanediol (about 90 to 100%); and modifying diol (0 to about 10%); and
(3) adipic acid (about 30 to about 75%); terephthalic acid (about 25 to about 70%); 1,4-butanediol (about 90 to 100%); and modifying diol (0 to about 10%).

The modifying diol preferably is selected from 1,4-cyclohexanedimethanol, triethylene glycol, polyethylene glycol and neopentyl glycol. The most preferred AAPE's are linear, branched or chain extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues comprise about 55 to about 60 mole percent, the terephthalic acid residues comprise about 40 to about 45 mole percent, and the diol residues comprise about 95 mole percent 1,4-butanediol residues. Such compositions are commercially available under the trademark EASTAR BIO® copolyester from Eastman Chemical Company, Kingsport, Tenn.

Additional, specific examples of preferred AAPE's include a poly(tetramethylene glutarate-co-terephthalate) containing (a) 50 mole percent glutaric acid residues, 50 mole percent terephthalic acid residues, and 100 mole percent 1,4-butanediol residues, (b) 60 mole percent glutaric acid residues, 40 mole percent terephthalic acid residues, and 100 mole percent 1,4-butanediol residues or (c) 40 mole percent glutaric acid residues, 60 mole percent terephthalic acid residues, and 100 mole percent 1,4-butanediol residues; a poly(tetramethylene succinate-co-terephthalate) containing (a) 85 mole percent succinic acid residues, 15 mole percent terephthalic acid residues, and 100 mole percent 1,4-butanediol residues or (b) 70 mole percent succinic acid residues, 30 mole percent terephthalic acid residues, and 100 mole percent 1,4-butanediol residues; a poly(ethylene succinate-co-terephthalate) containing 70 mole percent succinic acid residues, 30 mole percent terephthalic acid residues, and 100 mole percent ethylene glycol residues; and a poly(tetramethylene adipate-co-terephthalate) containing (a) 85 mole percent adipic acid residues, 15 mole percent terephthalic acid residues, and 100 mole percent 1,4-butanediol residues; or (b) 55 mole percent adipic acid residues, 45 mole percent terephthalic acid residues, and 100 mole percent 1,4-butanediol residues.

The AAPE preferably comprises from about 10 to about 1,000 repeating units and preferably, from about 15 to about 600 repeating units. The AAPE may have an inherent viscosity of about 0.4 to about 2.0 dL/g, or more preferably about 0.7 to about 1.6 dL/g, as measured at a temperature of 25° C. using a concentration of 0.5 gram copolyester in 100 ml of a 60/40 by weight solution of phenol/tetrachloroethane.

The AAPE, optionally, may contain the residues of a branching agent. The mole percentage ranges for the branching agent are from about 0 to about 2 mole %, preferably about 0.1 to about 1 mole %, and most preferably about 0.1 to about 0.5 mole % based on the total moles of diacid or diol residues (depending on whether the branching agent contains carboxyl or hydroxyl groups). The branching agent preferably has a weight average molecular weight of about 50 to about 5000, more preferably about 92 to about 3000, and a functionality of about 3 to about 6. The branching agent, for example, may be the esterified residue of a polyol having 3 to 6 hydroxyl groups, a polycarboxylic acid having 3 or 4 carboxyl groups (or ester-forming equivalent groups) or a hydroxy acid having a total of 3 to 6 hydroxyl and carboxyl groups. In addition, the AAPE or EVAc may be branched by the addition of a peroxide during reactive extrusion.

Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Examples of higher molecular weight polyol (MW 400-3000) branching agents are triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Although the acids may be used in their hydrogen form, they preferably are used as their lower alkyl esters or cyclic anhydrides in those instances where cyclic anhydrides can be formed. Representative hydroxy acids branching agents include, but are not limited to, malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aliphatic-aromatic polyesters of the invention also may comprise one or more ion-containing monomers to increase their melt viscosity. It is preferred that the ion-containing monomer is selected from salts of sulfoisophthalic acid and derivatives thereof. A typical example of this type of monomer is sodiosulfoisophthalic acid or the dimethyl ester of sodiosulfoisophthalic acid. The preferred concentration range for ion-containing monomers is about 0.1 to about 5.0 mole % and, preferably, about 0.3 to about 2.0 mole %, based on the total moles of diacid residues.

One example of a branched AAPE of the present invention is poly(tetramethylene adipate-co-terephthalate) containing 100 mole percent 1,4-butanediol residues, 43 mole percent terephthalic acid residues, 57 mole percent adipic acid residues, and 0.25 mole percent pentaerythritol as a branching agent. This AAPE may be produced by the transesterification and polycondensation of dimethyl adipate, dimethyl terephthalate, pentaerythritol and 1,4-butanediol. The AAPE may be prepared by heating the diacids, diols, and branching agent at 190° C. for 1 hour, 200° C. for 2 hours, 210° C. for 1 hour, then at 250° C. for 1.5 hours under vacuum in the presence of 100 ppm of Ti present initially as titanium tetraisopropoxide.

Another example of a branched AAPE is poly(tetramethylene adipate-co-terephthalate) containing 100 mole percent 1,4-butanediol residues, 43 mole percent terephthalic acid residues, 57 mole percent adipic acid residues, and 0.25 mole percent pyromellitic dianhydride as a branching agent. This AAPE is produced via reactive extrusion of linear poly(tetramethylene adipate-co-terephthalate) with pyromellitic dianhydride using an extruder.

The blend of the instant invention also may comprise from 0 to about 5 wt %, preferably about 0.3 to about 3.5 wt %, and more preferably 0.5 to about 2.5 wt %, based on the total weight of the AAPE, of one or more chain extenders. Exemplary chain extenders are divinyl ethers such as, for example, those disclosed in U.S. Pat. No. 5,817,721 or diisocyanates such as, for example, those disclosed in U.S. Pat. No. 6,303,677. Representative divinyl ethers are 1,4-butanediol divinyl ether, 1,5-hexanediol divinyl ether, and 1,4-cyclohexandimethanol divinyl ether.

Representative diisocyanates are toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate, isophorone diisocyanate, and methylenebis(2-isocyanatocyclohexane). The preferred diisocyanate is hexamethylene diisocyanate. It is also possible in principle to employ trifunctional isocyanate compounds which may contain isocyanurate and/or biurea groups with a functionality of not less than three, or to replace the diisocyanate compounds partially by tri-or polyisocyanates.

The AAPE's of the instant invention are readily prepared from the appropriate dicarboxylic acids, esters, anhydrides, or salts, the appropriate diol or diol mixtures, and any branching agents using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art and described, for example, in U.S. Pat. No. 2,012,267. Such reactions are usually carried out at temperatures from 150° C. to 300° C. in the presence of polycondensation catalysts such as, for example, alkoxy titanium compounds, alkali metal hydroxides and alcoholates, salts of organic carboxylic acids, alkyl tin compounds, metal oxides, and the like. The catalysts are typically employed in amounts between 10 to 1000 ppm, based on total weight of the reactants.

The reaction of the diol and dicarboxylic acid (and any may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, titanium tetrachloride, manganese diacetate, antimony oxide, dibutyl tin diacetate, zinc chloride, or combinations thereof. A three-stage manufacturing procedure, similar to that described in U.S. Pat. No. 5,290,631, may also be used, particularly when a mixed monomer feed of acids and esters is employed. For example, a typical aliphatic-aromatic copolyester, poly(tetramethylene glutarate-co-terephthalate) containing 30 mole percent terephthalic acid residues, may be prepared by heating dimethyl glutarate, dimethyl terephthalate, and 1,4-butanediol first at 200° C. for 1 hour then at 245° C. for 0.9 hour under vacuum in the presence of 100 ppm of Ti present initially as titanium tetraisopropoxide.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The blends of our invention also comprise about 1 to about 50 wt % of an poly(ethylene-co-vinyl acetate) copolymer, abbreviated herein as "EVAc". Representative examples of other EVAc levels present in the blend are about 1 to about 30 wt %, about 1 to about 20 wt %, and about 1 to 10 wt %. The vinyl acetate ("VA") content of the EVAc is selected from a range of compositions including pure polyvinyl acetate (100 wt % VA) to a pure polyethylene (0 wt % VA), depending on the intended use of the blend. Typically, VA contents less than about 50 wt % are preferred to provide a good melt strength while maintaining good biodegradability. Typical ranges of VA in the EVAc are about 4 to about 50 wt %, about 4 to about 40 wt %, and about 4 to about 30 wt %. EVAc resins having various ranges of VA content and melt index values are available commercially, for example, from DuPont Co. under the trademarks ELVAX® and BYNEL®.

EVAc resins are manufactured to a wide range of viscosities (denoted by melt index, abbreviated herein as "MI"). Typically, the MI ranges from 0.1 to 100 g/10-minutes at 190° C. at 2.16 kg and may be measured using ASTM Method D-1238. The selection of the MI for the EVAc is dictated by the MI of the AAPE order to ensure goo'd mixing, and to improve melt strength as indicated by an increase in the MI of the blend over the MI of the AAPE. The EVAc should have a MI that is less than that of the AAPE at the processing temperature of interest to have the optimum effect on the melt strength of the blend. The term "processing temperature", is understood to mean the temperature at which the blend of the invention is prepared or processed into shaped articles such as, for example, fibers, foamed objects, blown films, calendered films, molded articles, extruded articles, and the like. The melt index of the EVAc is preferably in the range of about 0.1 to about 30 g/10 min at 190° C. at 2.16 kg, more preferably about 0.1 to about 20, and most preferably, about 0.1 to about 15 g/10-minutes at 190° C. at 2.16 kg. For example, the EVAc may comprises about 4 to about 40 wt %, based on the total moles of the residues of vinyl acetate and has a melt index of about 0.1 to about 30 g/10 minutes at 190° C. at 2.16 kg.

Low levels of other comonomers might also be included in the EVAc. For example, vinyl alcohol copolymers can be prepared by a partial or complete saponification of the EVAc. Polymers consisting of nearly pure poly(vinyl alcohol) are already known to be compostable so their presence in the blend will be beneficial at any level. Other comonomers like vinyl chloride, ethylacrylate, methylacrylate, maleic acid or anhydride, acrylic acid ester, 1-butene, etc., also can be included. Typically, their levels of incorporation will be low (e.g. less than 5 wt %) to maintain good biodegradability, although higher levels may be compensated for by the addition of biodegradable additives and accelerants. Furthermore, photodegrading comonomers such as carbon monoxide and vinylketone are also known in the art to speed up fragmentation, and may also be included in the blends described herein.

The blends of the invention may contain biodegradable additives to enhance their disintegration and biodegradability in the environment. Thus, another aspect of the present invention is a polymer blend, comprising:

(A) about 50 to about 98 weight percent (wt %), based on the total weight of the blend, of an aliphatic-aromatic random copolyester comprising (a) diol residues comprising the residues of one or more of: 1,4-butanediol; 1,3-propanediol; ethylene glycol; 1,6-hexanediol; diethylene glycol; or 1,4-cyclohexanedimethanol; and (b) diacid residues comprising (i) about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and (ii) about 5 to about 65 mole %, based on the total moles of diacid residues, of the residues of one or more aromatic dicarboxylic acids selected from terephthalic acid and isophthalic acid;

(B) about 1 to about 20 wt %, based on the total weight of said blend, of an EVAc comprising about 4 to about 30 wt %, based on the total weight of said EVAc, of the residues of vinyl acetate; and (C) about 1 to about 40 wt % of a biodegradable additive, based on the total weight of said blend, wherein said blend has a melt index less than the melt index of said AAPE, as determined by ASTM Method D-1238.

As described previously, the blends of the invention do not contain significant amounts of a cellulose ester and, in one embodiment, do not contain cellulose esters. The AAPE, including the diol residues and diacid residues, and EVAc components of the blend are as set forth hereinabove. The blend also may comprise branching agents and chain extenders as described previously.

The AAPE preferably comprises the residues of one or more diols selected from 1,4-butanediol; 1,3-propanediol; ethylene glycol; 1,6-hexanediol; diethylene glycol; and 1,4-cyclohexanedimethanol. In addition, the AAPE preferably comprises about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and about 5 to about 65 mole %, based on the total moles of diacid residues, of the residues of one or more aromatic dicarboxylic acids selected from terephthalic acid and isophthalic acid. More preferably, the AAPE comprises the residues of 1,4-butanediol, adipic acid, and terephthalic acid. Most preferably the AAPE comprises about 100 mole % of the residues of 1,4-butanediol, about 40 to about 50 mole % of the residues of terephthalic acid, and about 50 to about 60 mole % of the residues of adipic acid.

The blend may contain about 1 to about 20 wt %, based on the total weight of the blend, of an ethylene-vinyl acetate copolymer (EVAc) comprising about 4 to about 30 wt % vinyl acetate, based on the total weight of the EVAc. Other exemplary ranges of VA that may be present in the EVAc are about 4 to about 50 wt % and about 4 to about 40 wt %. In addition to VA, the EVAc may comprise low levels (i.e., 0.1 to about 10 wt %) of additional comonomers as set forth previously such as, for example, vinyl alcohol, vinyl chloride, maleic anhydride, ethyl acrylate, methyl acrylate, acrylic acid ester, 1-butene, and the like.

The EVAc should have a MI that is less than that the AAPE at the processing temperature of interest to have the optimum effect on the melt strength of the blend. The melt index of the EVAc is preferably in the range of about 0.1 to about 30 g/10 min at 190° C. at 2.16 kg, more preferably about 0.1 to about 20, and most preferably, about 0.1 to about 15 g/10-minutes at 190° C. at 2.16 kg as determined by ASTM Method D-1238. For example, the EVAc may comprises about 4 to about 40 wt %, based on the total moles of the residues of vinyl acetate and has a melt index of about 0.1 to about 30 g/l 0 minutes at 190° C. at 2.16 kg.

The blend may comprise about 1 to about 40 wt % of a biodegradable additive. Other examples of biodegradable additive levels are about 5 to about 30 wt % and about 15 to about 30 wt %. One effect of such additives is to increase the biodegradability of the blend and to compensate for reduced biodegradability resulting from high concentrations of EVAc. The term "biodegradable", as used herein in reference to the AAPE's, blends, shaped articles, and additives of the present invention, is understood to mean that the AAPE's, blends, additives, and shaped articles are degraded under environmental influences such as, for example, in a composting environment, in an appropriate and demonstrable time span as defined, for example, by ASTM Standard Method, D6340-98, entitled "Standard Test Methods for Determining Aerobic Biodegradation of Radiolabeled Plastic Materials in an Aqueous or Compost Environment". The AAPE's, blends, shaped articles, and additives of the present invention also may be "biodisintegratable", meaning that these materials are easily fragmented in a composting environment as defined, for example, by DIN Standard 54900. For example, the biodegradable AAPE is initially reduced in molecular weight in the environment by the action of heat, water, air, microbes and other factors. This reduction in molecular weight results in a loss of physical properties (film strength) and often in film breakage. Once the molecular weight of the AAPE is sufficiently low, the monomers and oligomers are then assimilated by the microbes. In an aerobic environment, these monomers or oligomers are ultimately oxidized to $CO_2$, $H_2O$, and new cell biomass. In an anaerobic environment, the monomers or oligomers are ultimately oxidized to $CO_2$, $H_2$, acetate, methane, and cell biomass. Successful biodegradation requires that direct physical contact must be established between the biodegradable material and the active microbial population or the enzymes produced by the active microbial population. An active microbial population useful for degrading the films and blends of the invention can generally be obtained from any municipal or industrial wastewater treatment facility or composting facility. Moreover, successful biodegradation requires that certain minimal physical and chemical requirements be met such as suitable pH, temperature, oxygen concentration, proper nutrients, and moisture level. AAPE's such as those described herein are generally accepted by persons skilled in the art to be biodegradable and it is believed that the blends of the instant invention are biodegradable also.

Composting can be defined as the microbial degradation and conversion of solid organic waste into soil. One of the key characteristics of compost piles is that they are self heating; heat is a natural by-product of the metabolic break down of organic matter. Depending upon the size of the pile, or its ability to insulate, the heat can be trapped and cause the internal temperature to rise. Efficient degradation within compost piles relies upon a natural progression or succession of microbial populations to occur. Initially the microbial population of the compost is dominated by mesophilic species (optimal growth temperatures between 20 and 45° C.).

The process begins with the proliferation of the indigenous mesophilic microflora and metabolism of the organic matter. This results in the production of large amounts of metabolic heat which raise the internal pile temperatures to approximately 55–65° C. The higher temperature acts as a selective pressure which favors the growth of thermophilic species on one hand (optimal growth range between 45–60° C.), while inhibiting the mesophiles on the other.

Although the temperature profiles are often cyclic in nature, alternating between mesophilic and thermophilic populations, municipal compost facilities attempt to control their operational temperatures between 55–60° C. in order to obtain optimal degradation rates. Municipal compost units are also typically aerobic processes, which supply sufficient oxygen for the metabolic needs of the microorganisms permitting accelerated biodegradation rates.

Representative examples of the biodegradable additives which may be included in the blends of this invention include microcrystalline cellulose, methyl cellulose, hydroxypropyl cellulose, polylactic acid, polyhydroxybutyrate, polyhydroxyvalerate, polyvinyl alcohol, thermoplastic starch or other carbohydrates, or combinations thereof. Preferably, the biodegradable additive is a thermoplastic starch. A thermoplastic starch is a starch that has been gelatinized by extrusion cooking to impart a disorganized crystalline structure. As used herein, thermoplastic starch is intended to include "destructured starch" as well as "gelatinized starch", as described, for example, in Bastioli, C. *Degradable Polymers,* 1995, Chapman & Hall: London, pages 112–137. By gelatinized, it is meant that the starch granules are sufficiently swollen and disrupted such that they form a smooth viscous dispersion in the water. Gelatinization is effected by any known procedure such as heating in the presence of water or an aqueous solution at temperatures of about 60° C. The presence of strong alkali is known to facilitate this process. The thermoplastic starch may be prepared from any unmodified starch from cereal grains or root crops such as corn, wheat, rice, potato, and tapioca, from the amylose and amylopectin components of starch, from modified starch products such as partially depolymerized starches and derivatized starches, and also from starch graft copolymers. Thermoplastic starches are available commercially from National Starch Company.

The blends of our invention, optionally, may comprise various additives and/or processing aids conventional in the art. For example, the blend can include from about 0 to about 50 weight %, based on the total weight of the composition, of one or more additives selected from a lubricant, an antiblock, a plasticizer, a thermal stabilizer, an antioxidant, a pro-oxidant, an acid scavenger, an ultraviolet light stabilizer, a promoter of photodegradation, an antistatic agent, a pigment, a dye, and a colorant. Preferably, the blends may comprise 0 to about 30 wt % of one or more processing aids to alter the surface properties of the blend, to enhance flow, or to prevent sticking of the blend to the processing equipment. Representative examples of processing aids calcium carbonate, talc, clay, mica, wollastonite, kaolin, diatomaceous earth, $TiO_2$, $N_4Cl$, silica, calcium oxide, sodium sulfate, and calcium phosphate. Further examples of processing aid levels within the blends of the instant invention are about 5 to about 25 wt % and about 10 to about 20 wt %. Preferably, the processing aid is also a biodegradation accelerant, that is, the processing aid increases or accelerates the rate of biodegradation in the environment. Processing aids that may function to alter the pH of the composting environment such as, for example, calcium carbonate, calcium hydroxide, calcium oxide, barium oxide, barium hydroxide, sodium silicate, calcium phosphate, magnesium oxide, and the like, also may accelerate the biodegradation process. For the present invention, the preferred processing aid is calcium carbonate.

Typical plasticizers include dioctyl adipate, phosphates, and diethyl phthalate. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al. in U.S. Pat. Nos. 4,892,922, 4,892,923, 4,882,412, 4,845,188, 4,826,903, and 4,749,773.

Physical mixing of the components to form a blend can be accomplished in a number of ways, such as mixing the components in an appropriate solvent, for example, acetone, THF, $CH_2Cl_2$/MeOH, $CHCl_3$, dioxane, DMF, DMSO, AcOMe, AcOEt, and pyridine. Preferably, the blend components are mixed by thermal compounding. The most preferred method is by thermally compounding in an apparatus under high shear conditions such as a batch mixer, ribbon blender, banbury mixer, roll mill, torque rheometer, a single screw extruder, or a twin screw extruder. The term "high shear", as used herein, means a shear rate of about 50 $sec^{-1}$ or greater. Good mixing is desirable to help establish the integrity of the blends and is easily achieved in mixers with high shear and significant elongational flow, such as occurs with twin screw extruders. The high elongation stresses help to break the particles up, regardless of viscosity difference, and assure a good uniform mix. For mixers that rely predominantly on shear flow, such as, for example, single screw extruders, it is desirable that the viscosity ratio (or the reciprocal of the melt index ratio) of the distributed phase relative to the matrix phase is less than about 3 to 4.

The blends produced by thermally compounding can be converted to shaped articles by a methods known to persons skilled in the art such as, for example, extrusion, blowing, injection molding, calendering, and the like. Thus, our invention also provides shaped article comprising the blends as set forth hereinabove. The shaped article may comprise a film, a fibrous object, an extruded object, or a molded object and may also be biodistintegratable as determined by DIN Standard 54900 and/or biodegradable as determined by ASTM Standard Method, D6340-98. The blend components, for example, may be mixed together in a tumbler and then placed in a hopper of an extruder for melt compounding. Alternatively, the blend components may be added to the hopper of an extruder by various feeders which meter the pellets in their desired weight ratios. Upon exiting the extruder the now homogeneous blend may be extruded into a film, profile, fiber, or molded into an object. Films prepared from the blends of the invention are not restricted in any way. For example, the films may be a flat sheet or a tube and may also be stretched, for example, in a any direction by from 2 to 6 times the original measurements. Alternatively, the polymer can be shaped into other articles such as, for example, bottles, profiles, fibers, tubes, etc., via extrusion or injection molding.

In one embodiment of the invention, the shaped article is a cast, blown, calendered, or extruded film. Such films made have good tensile properties and can be very flexible depending upon the type and amount of AAPE, EVAc, and other components. The films may also contain significant quantities of colorant (i.e., pigment or dye).

Further examples of the shaped articles of the invention are molded parts, extruded objects, fibers, non-wovens, and foamed objects which benefit from being biodegradable. Films and fibers can be oriented. Orientation in many of these blends (especially those containing 1,4-butanediol) is accompanied by improved physical properties. These films can be oriented uniaxially or biaxially and can be oriented in a blown film operation.

The shaped articles of the invention include films that are useful in packaging applications where thin films are desirable. Particular useful articles are thin films that may function as a barrier and/or be biodegradable. For example, the shaped article may be a bag or a protective barrier films that may be used in disposable absorbent articles such as infant diapers, incontinence briefs, sanitary napkins, prophylactics, tampons, bed liners, bedpan liners, bandages, and the like. The shaped article may also function within other parts of disposable diapers in addition to being used as a protective barrier film such as, for example, as tabs, nonwovens, fibers, tape, and other parts needed in the construction of a diaper.

Films prepared from the instant blends have desirable moisture barrier properties. With the blends, the specific rates can be adjusted by modification of the blend composition. The water vapor transmission rates can also be controlled by the amount of aromatic dicarboxylic acid monomer present in the aliphatic-aromatic copolyester component of the blend. Of course, the water vapor transmission rates of the blends can be additionally controlled by the addition of an immiscible hydrophobic agent.

Other examples of shaped articles are molded plastic parts or as solid, foamed plastic objects. Examples of such parts include eyeglass frames, toothbrush handles, toys, automotive trim, tool handles, camera parts, razor parts, ink pen barrels, disposable syringes, bottles, and the like. The plastic parts, especially those made by a foamed method which gives the plastic part increased surface area, of this invention are particularly useful in applications were it is desired that the plastic part be environmentally non-persistent.

The shaped article may also comprise a fibrous object such as, for example, a yarn, a fabric, a melt blown web, a spunbonded web, a nonwoven fabric, or combinations thereof. The fibrous object may comprise one or more layers of fibers. Representative examples of fibrous objects include, but are not limited to, wipes, gauzes, tissues, diapers, fiber-containing cleaning products, laminating binders, sanitary napkins, panty liners, tampon, training pants, incontinent products, bandages, surgical dressings, or combinations of one or more of these objects that might be found in a hygiene products such as, for example, a disposable diaper. Other non-limiting examples of fibrous objects include cigarette filters, diaper topsheets, sanitary napkins, fishing line, fishing nets, fiber for producing surgical clothing, hygiene articles, absorbent fibers, fibers for conveying liquids, and the like. In addition to being spun from an appropriate solvent, the blends this invention may be melt-spun to produce fibers. The fibers may be oriented by drawing the fiber after spinning or by orientation during the spinning (cabinet orientation) and may be crimped. The fiber also may contain hydrophobic agents or, optionally, may be coated with hydrophobic agents.

In addition to the blends and shaped articles described herein, our invention also provides a process for a polymer blend, comprising blending at a high shear rate, (A) about 50 to about 98 weight percent (wt %), based on the total weight of the blend, of an aliphatic-aromatic random copolyester comprising
   (a) diol residues comprising the residues of one or more of: 1,4-butanediol; 1,3-propanediol; ethylene glycol; 1,6-hexanediol; diethylene glycol; or 1,4-cyclohexanedimethanol; and
   (b) diacid residues comprising
      (i) about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and
      (ii) about 5 to about 65 mole %, based on the total moles of diacid residues, of the residues of one or more aromatic dicarboxylic acids selected from terephthalic acid and isophthalic acid;
(B) about 1 to about 20 wt %, based on the total weight of the blend, of an EVAc comprising about 4 to about 30 wt %, based on the total weight of the EVAc, of the residues of vinyl acetate; and
(C) 1 to about 40 wt % of a biodegradable additive, wherein the blend has a melt index less than the melt index of the AAPE, as determined by ASTM Method D-1238.

Further, the our invention provides a process for increasing the melt-strength of an AAPE comprising blending at a high shear rate,
(A) about 50 to about 99 weight percent (wt %) of an aliphatic-aromatic random copolyester (AAPE); and
(B) about 1 to about 50 wt % of an EVAc having a melt index less than the melt index of the AAPE at processing temperatures, wherein the blend has a melt index less than the melt index of the AAPE, as determined by ASTM Method D-1238. The weight percentages are based on the total weight of the blend. The AAPE, including the diol residues and diacid residues, and EVAc components of the blend are as set forth hereinabove. The blend also may comprise branching agents and chain extenders as described previously.

The AAPE's preferably comprise the residues of one or more diols selected from 1,4-butanediol; 1,3-propanediol; ethylene glycol; 1,6-hexanediol; diethylene glycol; and 1,4-cyclohexanedimethanol. In addition, the AAPE preferably comprises about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and about 5 to about 65 mole %, based on the total moles of diacid residues, of the residues of one or more aromatic dicarboxylic acids selected from terephthalic acid and isophthalic acid. More preferably, the AAPE comprises the diol residues of 1,4-butanediol; non-aromatic dicarboxylic acid residues of adipic acid; and aromatic dicarboxylic acid residues of terephthalic acid. Most preferably the AAPE comprises about 100 mole % of the residues of 1,4-butanediol, about 40 to about 50 mole % of the residues of terephthalic acid, and about 50 to about 60 mole % of the residues of adipic acid.

The blend may contain about 1 to about 20 wt %, based on the total weight of the blend, of an ethylene-vinyl acetate copolymer (EVAc) comprising about 4 to about 30 wt % vinyl acetate, based on the total weight of the EVAc. Other examples of VA levels in the EVAc are about 4 to about 50 wt % and about 4 to about 40 wt %. In addition to VA, the EVAc may comprise low levels (i.e., 0.1 to about 10 wt %) of additional comonomers as set forth previously such as, for example, vinyl alcohol, vinyl chloride, ethylacrylate, methylacrylate, acrylic acid ester, 1-butene, and the like.

The EVAc have a MI that is less than that the AAPE at the processing temperature of interest to have the optimum effect on the melt strength of the blend. The melt index of the EVAc is preferably in the range of about 0.1 to about 30 g/10 min at 190° C. at 2.16 kg, more preferably about 0.1 to about 25 g/10 min at 190° C. at 2.16 kg, and most preferably, about 0.1 to about 15 g/10-minutes at 190° C. at 2.16 kg, as determine by ASTM Method D-1238. For example, the EVAc may comprises about 4 to about 40 mole %, based on the total moles of the residues of vinyl acetate and has a melt index of about 0.1 to about 30 g/10 minutes at 190° C. at 2.16 kg.

The blend may comprise about 1 to about 40 wt % of a biodegradable additive. Other examples of biodegradable additive levels are about 5 to about 30 wt % and about 5 to about 20 wt %. Representative examples of the biodegradable additives which may be included in the blends of this invention include microcrystalline cellulose, polylactic acid, polyhydroxybutyrate, polyhydroxyvalerate, polyvinyl alcohol, thermoplastic starch or other carbohydrates, or combination thereof. The blends, preferably, also may comprise 0 to about 30 wt % of one or more processing aids to alter the surface properties of the blend, to enhance flow, and to prevent sticking of the blend to the processing equipment. Representative examples of processing aids include calcium carbonate, talc, clay, mica, wollastonite, kaolin, diatomaceous earth, $TiO_2$, $NH_4Cl$, silica, calcium oxide, sodium sulfate, and calcium phosphate. The preferred processing aid is calcium carbonate. The invention is further illustrated and described by the following examples.

EXAMPLES

Examples 1–8

Blend Preparation—These examples describe the preparation of representative blends of the invention. The aliphatic-aromatic polyester were prepared from butanediol and a 57/43 ratio of adipic and terephthalic acid as the aliphatic-aromatic constituents. The inherent viscosity (I.V.) of this polymer was 1.05 dL/g (melt index=35 g/10 min).

The EVAc resins used for the blending were from the Dupont ELVAX® family. The first resin (Dupont ELVAX® 470) had a 0.7 melt index (MI) and 12 wt % vinyl acetate content. The second resin, Dupont ELVAX® 670, had a 0.3 MI and a vinyl acetate content of 18 wt %. The third resin was Dupont BYNEL® CXA6831 which had a vinyl acetate content of 9 wt % a melt index of 2.0 g/10 min at 190° C. at 2.16 kg, as determined by ASTM Method D-1238, and also incorporated a small amount of maleic anhydride as a tie layer in multilayer extrusion.

Blending was performed on a Werner Pfleidder twin screw extruder equipped with a medium shear mixing screw. The pellets were mixed at appropriate ratios at the feed throat using gravimetric feeders. In addition to the components described above, approximately 20 wt % of calcium carbonate was added as an antiblock because of the tacky nature of these resins. All heater zones were set at 170° C. except for the feed zone which was set at 100° C. to prevent sticking during feeding. Screw speed was nominally 250 rpm with a total feed rate of 40 lbs/hour. Nominal melt temperatures were 180 to 190° C. The twin screw was equipped with a strand die and water bath, followed by a pelletizer. These compounded pellets were then used for later experimentation. Sample, compositions are described in Table I. Blend ratios are before the addition of the calcium carbonate.

The melt index of the blends are also listed in Table I. The listed melt index is a calculated value using the logarithmic rule of mixtures approximation that is often applied to blends (i.e. $\log(MI_{blend}) = x_a \log(MI_a) + x_b \log(MI_b)$, as described in L. E. Nielsen *Polymer Rheology*, Marcel Dekker, New York (1977) p. 63, where the x's represent the weight fractions of each component "a" and "b". This equation is derived from a similar relationship for blend viscosities and works well when good mixing is achieved. Normally, the higher the melt index, the lower the viscosity and thus, the lower the melt strength.

Sag Testing and Melt Strength—As a comparison, sag tests were performed with various resins and blends of Examples 1–8 to determine the effect on melt strength and the data included in Table I. Strands were extruded at a fixed rate from a 1" Killion extruder with an L/D of 24. The die was scraped clean at time "zero" and the time required for the extrudate to hit the floor (approximately 1 meter) was termed the "sag time". Extrusion was performed at 170° C. (338° F.) although the die was at 150° C. (302° F.); thus, an effective melt temperature was estimated to be about 160° C. (320° F.) (there was strand cooling during falling). The AAPE control (Example 1) required 13.6 sec for the time to reach the floor. The addition of 200% of the EVAc resin (Examples 2 and 3) increased the sag time (and thus increased the melt strength). Furthermore, as shown in Table I, the melt index also was correspondingly reduced which is indicative of a increase in the viscosity ratio or melt strength ratio.

Blown Film Extrusion—Pellets made from Examples 1, 3, and 8 were run on a blown film line to make film. Pellets were pre-dried at 65° C. for 8 hrs to remove moisture. The extruder was a 2.5 inch with a 6 inch diameter blown film die. A dual lip air ring was used for the cooling.

Films were made having a final nominal thickness of 1 and 2 mils using a 2.5 nominal blow up ratio. The EVAc blends was much easier to process on the film line due to the added melt strength which made bubble stringing and stabilization much easier and with much less stickiness/tackiness. These blends were also better able to purge out degraded polyethylene from a previous run (due to higher viscosity) thereby minimizing startup time.

Examples 1, 3, and 8 were tested for mechanical properties. The control sample (Example 1) had a break stress of 24 and 20 MPa in the machine and transverse directions respectively. The elongations to break were >600% in each direction. Example 3, containing 20 wt % EVAc, had a slight drop in break stress to 15 and 13 MPa respectively. The elongation to break values were 470 and >600% for the machine and transverse directions. Example 8 had a breakstress of 27 and 20 Mpa and elongation at break values of >600%. Thus, Example 8 with 10% EVAc had better properties than the neat control. Higher levels of EVAc (Example 3) did lower the strength of the film slightly. Regardless, the film was still very tough and ductile and could accommodate other more brittle components such as, for example, starch, if needed.

TABLE I

Example Blends Comprising AAPE's and EVAc

| Example | Blend Composition (Wt %) | EVAc MI | EVAc mole % VA | Wt % CaCO3 | Blend MI | Sag time (s) |
|---|---|---|---|---|---|---|
| 1 | AAPE Control | — | — | 20 | 35 | 13.6 |
| 2 | 80/20 AAPE/Elvax 470 | 0.7 | 12 | 20 | 16 | 21.5 |
| 3 | 80/20 AAPE/Elvax 670 | 0.3 | 18 | 20 | 16 | 23.7 |
| 4 | 50/50 AAPE/Elvax 470 | 0.7 | 12 | 20 | 5 | 51.3 |
| 5 | 50/50 AAPE/Elvax 670 | 0.3 | 18 | 20 | 3.2 | 55.5 |
| 6 | 20/80 AAPE/Elvax 470 | 0.7 | 12 | 20 | 1.5 | 121.1 |
| 7 | 20/80 AAPE/Elvax 670 | 0.3 | 18 | 20 | 0.7 | 151.0 |
| 8 | 90/10 AAPE/Bynel CXA3861 | 2 | 9 | 20 | 26 | — |

Example 9

Blends with EVAc and Starch—This prophetic example is included to illustrate the procedure by which a thermoplastic starch could be included to form a ternary blend. The aliphatic-aromatic polyester consists of butanediol and a 45/65 ratio of adipic and terephthalic acid as the aliphatic-aromatic constituents and makes up 50% of the blend. The I.V. of this polymer is 1.05 dL/g (melt index=35 g/10 min). The EVAc used for the blending has a 0.7 melt index (MI) and 12% vinyl acetate content (e.g. Dupont Elvax® 470) and makes up 10% of the blend. A thermoplastic starch is added at 30 wt % along with 10 wt % calcium carbonate. Blending is performed on a Werner Pfleidder twin screw extruder equipped with a medium shear mixing screw. The pellets are mixed at appropriate ratios at the feed throat using gravimetric feeders. All heater zones are set at 170° C. except for the feed zone which was set at 100° C. to prevent sticking during feeding. Screw speed is nominally 250 rpm with a total feed rate of 40 lbs/hour. Nominal melt temperatures are 180 to 190° C. The twin screw was equipped with a strand die and water bath, followed by a pelletizer to make the final pellet form. These pellets can then be molded or extruded to make final articles such as film or fibers.

Example 10

Effect of CaCO3 to Accelerate Biodisintegration of AAPE—In three experiments, replicate samples (e.g., 3 identical samples per set) of EASTAR BIO® film, each containing 5, 10, 20, and 30 wt % calcium carbonate, were compared to replicate samples of EASTAR BIO® films of similar thickness containing 5, 10, 20, and 30 wt % talc for disintegration testing in accordance with DIN Standard 54900. In all cases, the EASTAR BIO® films with calcium carbonate had disintegration rates of 150% or greater than the corresponding films containing talc. Further, in the same experiments, EASTAR BIO®/EVAc blends with and without 20 wt % calcium carbonate were tested and showed that EASTAR BIO®/EVAc films containing 20 wt % calcium carbonate were completely disintegrated in 60 days versus 90 days for complete disintegration of films without calcium carbonate.

Example 11

Aerobic Biodegradation of AAPE's—The EASTAR BIO® aliphatic-aromatic polyester (available from Eastman Chemical Co.) was tested for biodegradability using ASTM Standard Method, D6340-98. Extruded films were prepared from EASTAR BIO® aliphatic-aromatic polyester (available from Eastman Chemical Co.) containing $^{14}C$ as 3-5% of the total carbon. In the first set of replicates, e.g., a set of 3 identical samples, the AAPE contained a 4% $^{14}C$ label universally distributed throughout the polyester. The first set of replicates was tested using an active MSW compost that was prepared in accordance with ASTM Method 6340-98; this compost contained 58 wt % (±2 wt %) carbon. A second set of replicates, which served as a negative control, was prepared in which the AAPE contained a 4% $^{14}C$ label universally distributed throughout the polymer. This set was tested in compost that was sterilized at 121° C. and 17 pounds per square inch for 20 minutes.

The film samples (700 g of each), containing 108 dpm (±2%) counts/gram, were mixed into a testing apparatus, in accordance with ASTM Method 6340-98, containing a MSW compost to give a background count of 26 dpm. The compost was prepared as described in the ASTM 6340-98' method and showed a moisture content at the beginning of the experiment of 56 wt %, a pH of 7.1, and a carbon to nitrogen ratio of 14 to 1. Moisture was maintained between 55 and 60 wt % throughout the test. The temperature of the test apparatus was maintained at 58° C. during the first 2 days of the test and then was maintained at 54–56° C. for the remainder of the test.

Oxygen gas was passed through the apparatus at a rate of 15 mL/min (±2 mL/min). All gases leaving the apparatus were passed through a acid trap followed by two, 250 mL $CO_2$ absorption columns in sequence. The columns contained Carbosorb® E+ trapping reagent (available from Perkin-Elmer Corporation). The $CO_2$ trapping fluid from each column was drained daily and the volume measured. A 1 mL sample was taken from each column and mixed with 16 mL of PERMAFLOUR® E+ Scintillation reagent (available Perkin-Elmer Corporation) and 3 mL of methanol in a standard glass scintillation vial. The vial was mixed by inversion 10 times and was placed in the counting rack. All samples were allowed to stand for 8 hours prior to counting. Any samples that separated during this period were remixed prior to counting.

Calculations and interpolations of results were carried out in accordance with ASTM Method D6340-98 and are provided in Table II. As is seen from the results of Table II, the AAPE showed almost complete degradation after 360 days in a composting environment. Based on the results of this example and Example 10, it is believed that the blends of the present invention are biodegradable as defined by ASTM Method D6340-98.

TABLE II

Average Percent Cumulative $CO_2$

| | Replicate Sample Sets (Avg % Cumulative CO2) | |
|---|---|---|
| Day | 1 | 2 |
| 1 | 0 | 0 |
| 15 | 11 | 0 |
| 30 | 34 | 0 |
| 60 | 52 | 0 |
| 90 | 68 | 0 |
| 120 | 79 | 0 |
| 150 | 86 | 0 |
| 180 | 94 | 0 |
| 210 | 96 | 0.1 |
| 240 | 97 | 0.3 |
| 270 | 98 | 0.3 |
| 300 | 99 | 0.4 |
| 330 | 99 | 0.4 |
| 360 | 99 | 0.4 |

We claim:
1. A polymer blend, comprising:
(A) about 50 to about 99 weight percent (wt %) of an aliphatic-aromatic random copolyester (AAPE) having an inherent viscosity of about 0.8 to 1.6 dl/g; and
(B) about 1 to about 50 wt % of a poly(ethylene-co-vinyl acetate) copolymer (EVAc),
wherein said blend has a melt index less than the melt index of said AAPE, as determined by ASTM Method D-1238, and said weight percentages are based on the total weight of said blend.

2. The blend according to claim 1 wherein said AAPE comprises (A) diol residues comprising the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms, wherein said substituted diols contain 1 to about 4 substituents independently selected from halo, $C_6$–$C_{10}$ aryl, and $C_1$–$C_4$ alkoxy; and (B) diacid residues comprising
  (i) about 35 to about 99 mole %, based on the total moles of diacid residues, of the residues of one or more substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms, wherein said substituted non-aromatic dicarboxylic acids contain 1 to about 4 substituents selected from halo, $C_6$–$C_{10}$ aryl, and $C_1$–$C_4$ alkoxy; and
  (ii) about 1 to about 65 mole %, based on the total moles of diacid residues, of the residues of one or more substituted or unsubstituted aromatic dicarboxylic acids containing 6 to about 10 carbon atoms, wherein said substituted aromatic dicarboxylic acids contain 1 to about 4 substituents selected from halo, $C_6$–$C_{10}$ aryl, and $C_1$–$C_4$ alkoxy.

3. The blend according to claim 2 wherein said non-aromatic dicarboxylic acids comprise one or more dicarboxylic acids selected from glutaric acid, diglycolic acid, succinic acid, adipic acid, and 1,4-cyclohexanedicarboxylic acid; and said aromatic dicarboxylic acids comprise one or more dicarboxylic acids selected from terephthalic acid, isophthalic acid, salts of 5-sulfoisophthalic acid, and 2,6-naphthalenedicarboxylic acid.

4. The blend according to claim 3 wherein said diols comprise one or more diols selected from: 1,4-butanediol; 1,3-propanediol; ethylene glycol; 1,6-hexanediol; diethylene glycol; and 1,4-cyclohexanedimethanol.

5. The blend according to claim 4 wherein said EVAc has a melt index less than the melt index of said AAPE, as determined by ASTM method D-1238, at processing temperatures.

6. The blend according to claim 5 wherein said EVAc comprises about 4 to about 40 wt %, based on the total weight of said EVAc, vinyl acetate and has a melt index of about 0.1 to about 30 g/10 minutes at 190° C. at 2.16 kg as determined by ASTM method D-1238.

7. The blend according to claim 6 wherein said non-aromatic dicarboxylic acids comprise adipic acid; said aromatic dicarboxylic acids comprise terephthalic acid; and said diols comprise 1,4-butanediol.

8. The blend according to claim 6 further comprising 0 to about 2 mole %, based on the total moles of acid or diol residues, of the residues of one or more branching agents selected from tartaric acid, citric acid, malic acid, 1,3,5-benzenetricarboxylic acid, pentaerythritol, dipentaerythritol, trimethylolpropane, trimethylolethane, polyethertriols, glycerol, trimesic acid, trimellitic acid, trimellitic anhydride, pyromellitic acid, pyromellitic anhydride, 4-carboxyphthalic anhydride, and hydroxyisophthalic acid.

9. The blend according to claim 8 further comprising 0 to about 5 wt %, based on the total weight of said blend, of one or more chain extenders selected from toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate, isophorone diisocyanate and methylenebis(2-isocyanatocyclohexane).

10. A polymer blend, comprising:
(A) about 50 to about 98 weight percent (wt %), based on the total weight of said blend, of an aliphatic-aromatic random copolyester (AAPE) comprising
  (a) diol residues comprising the residues of one or more of: 1,4-butanediol; 1,3-propanediol; ethylene glycol; 1,6-hexanediol; diethylene glycol; or 1,4-cyclohexanedimethanol; and
  (b) diacid residues comprising
    (i) about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and
    (ii) about 5 to about 65 mole %, based on the total moles of diacid residues, of the residues of one or more aromatic dicarboxylic acids selected from terephthalic acid and isophthalic acid;
(B) about 1 to about 20 wt %, based on the total weight of said blend, of an EVAc comprising about 4 to about 30 wt %, based on the total weight of said EVAc, of the residues of vinyl acetate; and
(C) about 1 to about 40 wt %, based on the total weight of said blend, of a biodegradable additive,
wherein said blend has a melt index less than the melt index of said AAPE, as determined by ASTM Method D-1238.

11. The blend according to claim 10 wherein said biodegradable additive comprises one or more of: thermoplastic starch, microcrystalline cellulose, polylactic acid, polyhydroxybutyrate, or polyvinyl alcohol.

12. The blend according to claim 10 or 11 wherein said diols comprise 1,4-butanediol; said non-aromatic dicarboxylic acids comprise adipic acid; and said aromatic dicarboxylic acids comprise terephthalic acid.

13. The blend according to claim 11 wherein said EVAc has a melt index less than the melt index of said AAPE at processing temperatures as determined by ASTM Method D-1238.

14. The blend according to claim 11 further comprising 0 to about 30 wt % of one or more processing aids selected from calcium carbonate, talc, clay, mica, wollastonite, kaolin, diatomaceous earth, $TiO_2$, $NH_4Cl$, silica, calcium oxide, sodium sulfate, and calcium phosphate.

15. The blend according to claim 14 wherein said processing aid is also a biodegradation accelerant.

16. The blend according to claim 15 wherein said processing aid is calcium carbonate.

17. A shaped article comprising the polymer blend of claim 6 or 11.

18. The shaped article according to claim 17 wherein said article comprises a film, a fibrous object, an extruded object, or a molded object.

19. The shaped article according to claim 18 wherein said article is biodistintegratable as determined by DIN Standard 54900.

20. The shaped article according to claim 19 wherein said article is biodegradable as determined by ASTM Standard Method 6340-98.

21. The shaped article according to claim 20 wherein said article is a cast, blown, calendered, or extruded film.

22. The shaped article of claim 21 wherein said article is a bag.

23. The shaped article of claim 20 wherein said fibrous object comprises one or more of: a yarn, a fabric, a melt blown web, a spunbonded web, or a nonwoven fabric.

24. The shaped article of claim 23 wherein said fibrous object comprises one or more layers of fibers.

25. The shaped article of claim 24 wherein said fibrous object comprises one or more objects selected from: wipes, gauzes, tissues, diapers, fiber-containing cleaning products, laminating binders, sanitary napkins, panty liners, tampon, training pants, incontinent products, bandages, or surgical dressings.

26. A process for preparing a polymer blend, comprising blending at a high shear rate,
   (A) about 50 to about 98 weight percent (wt %), based on the total weight of said blend, of an aliphatic-aromatic random copolyester (AAPE) comprising
      (a) diol residues comprising the residues of one or more of: 1,4-butanediol; 1,3-propanediol; ethylene glycol; 1,6-hexanediol; diethylene glycol; or 1,4-cyclohexanedimethanol; and
      (b) diacid residues comprising
         (i) about 35 to about 95 mole %, based on the total moles of diacid residues, of the residues of one or more non-aromatic dicarboxylic acids selected from glutaric acid, diglycolic acid, succinic acid, 1,4-cyclohexanedicarboxylic acid, and adipic acid; and
         (ii) about 5 to about 65 mole %, based on the total moles of diacid residues, of the residues of one or more aromatic dicarboxylic acids selected from terephthalic acid and isophthalic acid;
   (B) about 1 to about 20 wt %, based on the total weight of said blend, of an EVAc comprising about 4 to about 30 wt %, based on the total weight of said EVAc, of the residues of vinyl acetate; and
   (C) 1 to about 40 wt % of a biodegradable additive,
wherein said blend has a melt index less than the melt index of said AAPE, as determined by ASTM Method D-1238.

27. The process according to claim 26 wherein said biodegradable additive comprises one or more of: thermoplastic starch, microcrystalline cellulose, polylactic acid, polyhydroxybutyrate, or polyvinyl alcohol.

28. A process for increasing the melt-strength of an an aliphatic-aromatic random copolyester comprising blending at a high shear rate,
   (A) about 50 to about 99 weight percent (wt %) of an aliphatic-aromatic random copolyester (AAPE) having an inherent viscosity of about 0.8 to 1.6 dl/g; and
   (B) about 1 to about 50 wt % of an EVAc having a melt index less than the melt index of said AAPE at processing temperatures,
wherein said blend has a melt index less than the melt index of said AAPE, as determined by ASTM Method D-1238, and said weight percentages are based on the total weight of said blend.

29. The blend according to claim 1, which comprises less than 5 wt % of cellulose esters.

30. The blend according to claim 1, which does not contain a cellulose ester.

31. The blend according to claim 10, which comprises less than 5 wt % of cellulose esters.

32. The blend according to claim 10, which does not contain a cellulose ester.

33. The process according to claim 26, wherein the blend comprises less than 5 wt % of cellulose esters.

34. The process according to claim 26, wherein the blend does not contain a cellulose ester.

35. The process according to claim 28, wherein the blend comprises less than 5 wt % of cellulose esters.

36. The process according to claim 28, wherein the blend does not contain a cellulose ester.

37. The blend according to claim 10, wherein said AAPE has an inherent viscosity of about 0.8 to 1.6 dl/g.

38. The blend according to claim 26, wherein said AAPE has an inherent viscosity of about 0.8 to 1.6 dl/g.

39. The blend according to claim 28, wherein said AAPE has an inherent viscosity of about 0.8 to 1.6 dl/g.

* * * * *